United States Patent
Zhu et al.

(10) Patent No.: US 10,757,658 B2
(45) Date of Patent: Aug. 25, 2020

(54) POWER ALLOCATION AND PRECODING MATRIX COMPUTATION METHOD IN A WIRELESS COMMUNICATION SYSTEM

(71) Applicant: Ping Liang, Newport Coast, CA (US)

(72) Inventors: Dengkui Zhu, Beijing (CN); Boyu Li, Irvine, CA (US); Ping Liang, Newport Coast, CA (US)

(73) Assignee: RF DSP Inc., Irvine, CA (US)

( * ) Notice: Subject to any disclaimer, the term of this patent is extended or adjusted under 35 U.S.C. 154(b) by 0 days.

(21) Appl. No.: 15/576,709

(22) PCT Filed: Jun. 28, 2016

(86) PCT No.: PCT/US2016/039685
§ 371 (c)(1),
(2) Date: Nov. 23, 2017

(87) PCT Pub. No.: WO2017/003963
PCT Pub. Date: Jan. 5, 2017

(65) Prior Publication Data
US 2018/0139703 A1    May 17, 2018

Related U.S. Application Data

(60) Provisional application No. 62/185,674, filed on Jun. 28, 2015.

(51) Int. Cl.
*H04B 7/0452* (2017.01)
*H04W 72/04* (2009.01)
*H04W 52/24* (2009.01)
*H04W 52/34* (2009.01)
(Continued)

(52) U.S. Cl.
CPC .......... *H04W 52/24* (2013.01); *H04B 7/0452* (2013.01); *H04B 7/06* (2013.01); *H04W 52/34* (2013.01); *H04W 72/0473* (2013.01); *H04B 7/0617* (2013.01); *H04W 88/08* (2013.01)

(58) Field of Classification Search
None
See application file for complete search history.

(56) References Cited

U.S. PATENT DOCUMENTS 8,274,431 B1 * 9/2012 Lee .................. H01Q 1/246
                                              342/377
2004/0235529 A1 * 11/2004 Tarokh .............. H01Q 1/246
                                              455/562.1

(Continued)

*Primary Examiner* — Kodzovi Acolatse
*Assistant Examiner* — The Hy Nguyen
(74) *Attorney, Agent, or Firm* — Guosheng Wang; United States Research and Patent Firm

(57) ABSTRACT

This invention presents methods for power allocation for each data stream on each transmitting antennas in MU-MIMO wireless communication systems comprising the BS computing the temporary beamforming matrix, constructing special matrices and vectors with the maximum transmitting power on each antenna, the allocated power to each data stream, the channel quality of each data stream, and the amplitude of each element of the temporary beamforming matrix, calculating the power allocated to each data stream on each antenna with the calculated special matrices and vectors, and adjusting each element of the temporary beamforming matrix to obtain the final beamforming matrix.

6 Claims, 3 Drawing Sheets

(51) Int. Cl.
*H04B 7/06* (2006.01)
*H04W 88/08* (2009.01)

(56) References Cited

U.S. PATENT DOCUMENTS

| | | | | |
|---|---|---|---|---|
| 2006/0098754 | A1* | 5/2006 | Kim | H04B 7/0426 375/267 |
| 2009/0286494 | A1* | 11/2009 | Lee | H04L 25/03191 455/114.3 |
| 2012/0289266 | A1* | 11/2012 | Park | H04B 7/0452 455/501 |
| 2013/0267266 | A1* | 10/2013 | Park | H04B 7/0456 455/501 |
| 2014/0105102 | A1* | 4/2014 | Balraj | H04L 1/0026 370/328 |
| 2014/0185700 | A1* | 7/2014 | Dong | H04B 7/0452 375/267 |
| 2015/0124765 | A1* | 5/2015 | Rong | H04B 7/0465 370/329 |

* cited by examiner

POWER ALLOCATION AND PRECODING MATRIX COMPUTATION METHOD IN A WIRELESS COMMUNICATION SYSTEM

This application claims the benefit of U.S. Provisional Application No. 62/185,674, filed on Jun. 28, 2015.

FIELD OF THE INVENTION

The disclosed inventions relate generally to wireless communication, and in particular, to the mechanism for a Base Station (BS) to allocate power and precode the signal before it is transmitted to the User Equipment (UE) in massive Multiple-Input Multiple-Output (MIMO) communication systems.

BACKGROUND

Large-scale MIMO systems or massive MIMO systems were firstly introduced in [1] where each BS is equipped with dozens to several hundreds of transmit antennas. One main advantage of such systems is the potential capability to offer linear capacity growth without increasing power or bandwidth [1][4], which is realized by employing Multi-User MIMO (MU-MIMO) to achieve the significant higher spatial multiplexing gains than conventional systems. In this system, the BS groups UEs at each scheduling slot and transmits data to them on the same time and frequency resource.

It has been proved that Zero-Forcing (ZF) precoding with a total transmitting power constraint is almost the best choice to maximize the sum rate for large-scale MU-MIMO systems [2]. However, in practice, the power of each antenna is restricted instead of the total power. It means that maximizing the power utilization requires the sum power of all users at each antenna to be the same. Unfortunately, it is generally not the case in practice, because of the randomness of the ZF precoding matrix. As a result, it causes a dilemma to the BS: on the one hand, ZF precoding could not fully use the transmit power, which leads to throughput loss; on the other hand, full power utilization means that there exists residual interference among the grouped users, since the ZF precoding matrix is violated, which also results in throughput loss. Conjugate Beamforming (CB) is another practical precoding method for MU-MIMO precoding in large-scale MIMO communication systems because of its simplicity for implementation. Similarly to ZF, CB also faces the optimal power allocation problem when the power of each antenna is restricted. Therefore, more sophisticated power allocation methods are needed to maximum the sum rate of MU-MIMO systems. Due to the aforementioned reasons, this invention provides four different methods to allocate the power to each data stream based on two different optimization objectives when ZF precoding is employed by the BS. In addition, a simple power allocation method is also offered when CB is employed by the BS. The advantages of this invention include: 1. when ZF precoding is employed, two of the four power allocation methods have better performance than the rest two in the low Signal-to-Noise Ratio (SNR) region and vice versa, so different power allocation methods could be employed in different SNR regions to achieve the maximum sum rate of MU-MIMO systems; 2. when CB is employed, a very simple power allocation method could be employed with little sum rate loss; 3. the sum rate losses of all methods provided in this invention are negligible compared to the case where the total transmitting power instead of the per-antenna power is constrained; 4. most importantly, these methods are not affected by a scaling factor of each channel vector so channel estimation with an arbitrary scaling factor would be sufficient, which alleviates the accuracy requirement of channel measurement in massive MIMO systems.

SUMMARY OF THE INVENTION

This application provides several methods to complete power allocation and precoding matrix computation in MU-MIMO systems. For ZF precoding, two methods are provided to maximize the power utilization, where one is based on orthogonal projection while the other one is based on iterative searching the optimal solution in the constraint domain. In addition, two more methods are provided to minimize the inter-user interference among UEs in the MU-MIMO user group, where one is based on linear scaling while the other one is based on iterative searching. Among the four methods, the first two methods are the better choices in the low SNR region while the latter two methods are the better choices in the high SNR region. For CB, a simple but rate-lossless method is provided where the power of each antenna could be totally consumed.

BRIEF DESCRIPTION OF THE DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION OF THE PREFERRED EMBODIMENTS

Figure 1:
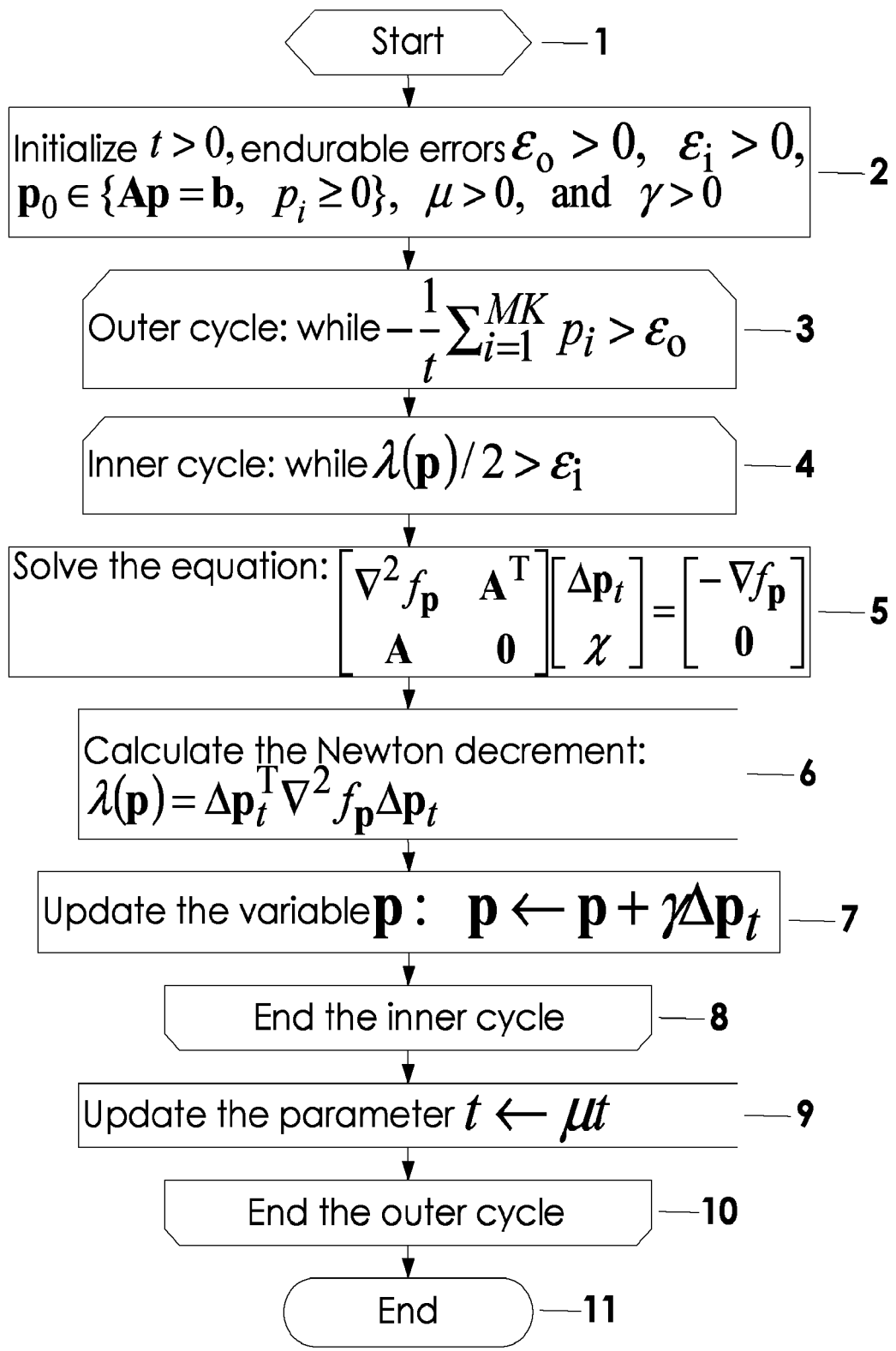
FIG. 1 shows the block diagram illustrating the iteration process of searching the optimal solution to (12).

For a large-scale MIMO system, suppose that the number of antennas at the BS side is M, and the number of multiplexed data streams is K in the downlink on a Resource Element (RE) such as a subcarrier, or a Resource Block (RB), etc. Note that the K data streams belong to N users, where N≤K. Suppose that the channel matrix corresponding to the K data streams is $H=[h_1\ h_2\ \ldots\ h_K]^T$, which may be acquired by BS through uplink channel measurement or uplink feedback channel.

The K modulated signals on the current RE are precoded by a matrix W before being further processed, where W has the dimension of M×K and the (m,k)th element is $w_{mk}$, where m=1, 2, ..., M, and k=1, 2, ..., K.

If the ZF precoding method is employed, the BS firstly computes a temporary matrix $$H^{inv} = H^H(HH^H)^{-1}, \quad (1)$$

then the (m,k)th element of the matrix $H^{inv}$ can be written as $$h_{mk}^{inv} = |h_{mk}^{inv}|e^{j\theta_{mk}}. \quad (2)$$

Let $P_1^{ant}, P_2^{ant}, \ldots, P_M^{ant}$ denote the power allocated to the current RE belonging to the M antennas respectively, then the power allocated to the kth data stream by the BS is $P_k$, which satisfies $\Sigma_{k=1}^{K} P_k = \Sigma_{m=1}^{M} P_m^{ant}$. One possible example is $$P_k = \frac{\sum_{m=1}^{M} P_m^{ant}}{K}. \quad (3)$$

In order to complete the power allocation, four methods belonging to two categories are provided in this invention, where the first category is based on maximizing the power utilization, while the second one is based on minimizing the inter-user interference.

Category-1: Maximizing the Power Utilization.

In this category, the BS constructs an (M+K−1)×MK matrix A by deleting the $k_d$th row vector of the following temporary matrix $$A_T = \begin{bmatrix} 1 & 1 & \ldots & 1 & 0 & 0 & \ldots & 0 & \ldots & 0 & 0 & \ldots & 0 \\ 0 & 0 & \ldots & 0 & 1 & 1 & \ldots & 1 & \ldots & 0 & 0 & \ldots & 0 \\ \vdots & \vdots & \ddots & \vdots & \vdots & \vdots & \ddots & \vdots & \ddots & \vdots & \vdots & \ddots & \vdots \\ 0 & 0 & \ldots & 0 & 0 & 0 & \ldots & 0 & \ldots & 1 & 1 & \ldots & 1 \\ 1 & 0 & \ldots & 0 & 1 & 0 & \ldots & 0 & \ldots & 1 & 0 & \ldots & 0 \\ 0 & 1 & \ldots & 0 & 0 & 1 & \ldots & 0 & \ldots & 0 & 1 & \ldots & 0 \\ \vdots & \vdots & \ddots & \vdots & \vdots & \vdots & \ddots & \vdots & \ddots & \vdots & \vdots & \ddots & \vdots \\ 0 & 0 & \ldots & 1 & 0 & 0 & \ldots & 1 & \ldots & 0 & 0 & \ldots & 1 \end{bmatrix}, \quad (4)$$

where the (i,j)th element of $A_T$ satisfies the conditions $$a_{ij} = \begin{cases} 1, & \text{if } 1 \le i \le K, j = (i-1)M+l, l = 1, \ldots, M, \\ 0, & \text{if } 1 \le i \le K, j \ne (i-1)M+l, l = 1, \ldots, M, \\ 1, & \text{if } K+1 \le i \le K+M, j = lM+(i-K), l = 0, \ldots, K-1, \\ 0, & \text{if } K+1 \le i \le K+M, j \ne lM+(i-K), l = 0, \ldots, K-1 \end{cases} \quad (5)$$

and $k_d \in \{1, \ldots, MK\}$ may be any one of the MK possible values.

The BS constructs an (M+K−1)×1 vector b by deleting the $k_d$th element of the temporary vector $$b_T = [P_1 \ldots P_K P_1^{ant} \ldots P_M^{ant}]^T. \quad (6)$$

An MK×1 vector r is constructed as $$r = [r_{11} \ldots r_{M1} r_{12} \ldots r_{M2} \ldots r_{1K} \ldots r_{MK}]^T \quad (7)$$

where the elements of r satisfy $$\frac{r_{mk}}{r_{lk}} = \frac{|h_{mk}^{inv}|^2}{|h_{lk}^{inv}|^2}, l, m = 1, \ldots, M, k = 1, \ldots, K, \quad (8)$$

e.g., $r_{mk} = |h_{mk}^{inv}|^2$.

With the matrix A and vectors b and r, two possible methods could be used to compute the power allocated to each data stream on each antenna.

Method-1: Orthogonal Projection.

In this method, the BS projects the vector r into the solution space of the equation Ax=b firstly by $$\tilde{p} = [I - \tilde{A}^T(\tilde{A}\tilde{A}^T)^{-1}\tilde{A}]\tilde{r}, \quad (9)$$

where $\tilde{A} = [A\ b]$ and $\tilde{r} = [r^T - a]^T$ with a being a positive real number. Then, the elements of power allocation matrix are computed as $$p_{mk} = \frac{\tilde{p}(mk)}{\tilde{p}(MK+1)}, m = 1, \ldots, M, k = 1, \ldots, K. \quad (10)$$

Method-2: Iterative Searching.

In this method, the power allocation vector is computed by solving the following problem $$\min \|p - r\|_2^2,$$

$$s.t.\ Ap - b = 0,$$

$$-p \le 0. \quad (11)$$

The problem (11) can be solved by iterative searching in the constraint domain. One possible solution is to firstly transform (11) into an equivalent problem $$\min f(t,p) = -t\|p - r\|_2^2 - \Sigma_{i=1}^{MK} p_i,$$

$$s.t.\ Ap = b, \quad (12)$$

then the iterative searching process in FIG. 1 is used to find the optimal p. Specifically, after the searching process starts 1, the input parameters are initialized as t>0, $\varepsilon_o$>0, $\varepsilon_i$>0, $p_0 \in \{Ap=b, p_i \ge 0\}$, µ>0, and γ>0, where $\varepsilon_o$ and $\varepsilon_i$ are endurable errors for the outer and inner searching cycles respectively, $P_0$ is an initial power allocation matrix, while µ and γ are two adjusting parameters 2. Then, the outer searching cycle runs while $$-\frac{1}{t}\sum_{i=1}^{MK} p_i > \varepsilon_o$$

3, and the inner searching cycle runs while λ(p)/2>$\varepsilon_i$ 4. Inside the inner cycle, the first step is to solve the equation $$\begin{bmatrix} \nabla^2 f_p & A^T \\ A & 0 \end{bmatrix} \begin{bmatrix} \Delta p_t \\ \chi \end{bmatrix} = \begin{bmatrix} -\nabla f_p \\ 0 \end{bmatrix},$$

where χ is an adjusting parameter 5. Then, the Newton decrement is calculated as λ(p)=$\Delta p_t^T \nabla^2 f_p \Delta p_t$ 6. After that, the variable p is updated as p←p+γ$\Delta p_t$ 7. After the inner cycle ends 8, the parameter t is updated as t←µt 9. After the outer cycle ends 10, the whole process ends 11. Finally, the vector p is reshaped to a matrix with elements $p_{mk}$, m=1, ..., M, and k=1, ..., K.

With $p_{mk}$, the elements $w_{mk}$ of the precoding matrix W can be computed as $$w_{mk} = \sqrt{p_{mk}} e^{j\theta_{mk}}, m = 1, \ldots, M, k = 1, \ldots, K. \quad (13)$$

Category-2: Minimizing the Inter-User Interference.

In this category, two possible methods are provided to minimize the inter-user interference.

Method-1: Linear Scaling.

In this method, the BS computes a temporary power allocation matrix with elements $$\tilde{p}_{mk} = \frac{P_k |h_{mk}^{inv}|^2}{\sum_{m=1}^{M} |h_{mk}^{inv}|^2}$$

firstly, where $h_{mk}^{inv}$ is the same as in (2), then computes the power consumed on each antenna as $Q_m = \sum_{k=1}^{K} \tilde{p}_{mk}$, m=1, ..., M. After that, the BS chooses the maximum value of $Q_m$, which is denoted as $Q_{max}$. Finally, the power allocation matrix is computed as $$p_{mk} = \frac{\tilde{p}_{mk} P_m^{ant}}{Q_{max}}, m = 1, \ldots, M, k = 1, \ldots, K. \quad (14)$$

Method-2: Iterative Water-Filling Method.

In this method, the BS constructs an (M+K)×K matrix A with a form of $$A = \begin{bmatrix} a_{11} & \cdots & a_{1K} \\ \vdots & \ddots & \vdots \\ a_{M1} & \cdots & a_{MK} \\ -1 & \cdots & 0 \\ \vdots & \ddots & \vdots \\ 0 & \cdots & -1 \end{bmatrix}, \quad (15)$$

where the elements $a_{mk}$, m=1, ..., M, and k=1, ..., K, satisfy $$a_{mk} = \begin{cases} \dfrac{|h_{mk}^{inv}|^2}{\sum_{m=1}^{M} |h_{mk}^{inv}|^2}, & m = 1, \ldots, M, k = 1, \ldots, K, \\ 1, & m = M + k, \\ 0, & \text{otherwise} \end{cases} \quad (16)$$

The BS constructs an (M+K)×1 vector b as $$b = [P_1^{ant} \ldots P_M^{ant} 0 \ldots 0]^T. \quad (17)$$

Let the power allocation vector $p^s$ be $p^s = [P_1^s \ldots P_K^s]^T$, where $P_k^s$, k=1, ..., K, are the power allocated to the kth data stream. Then, $p^s$ can be obtained by solving the following optimization problem $$\min -\sum_{k=1}^{K} \log(1 + g_k P_k^s),$$
$$s \cdot t \cdot Ap^s - b \leq 0, \quad (18)$$

where $$g_k = \frac{\|h_k\|^2}{\sigma_{NI}^2}$$

denotes the signal-to-Interference-plus-Noise Ratio (SINR) of the kth stream with $\sigma_{NI}^2$ being the power of the noise and interference.

Figure 2:
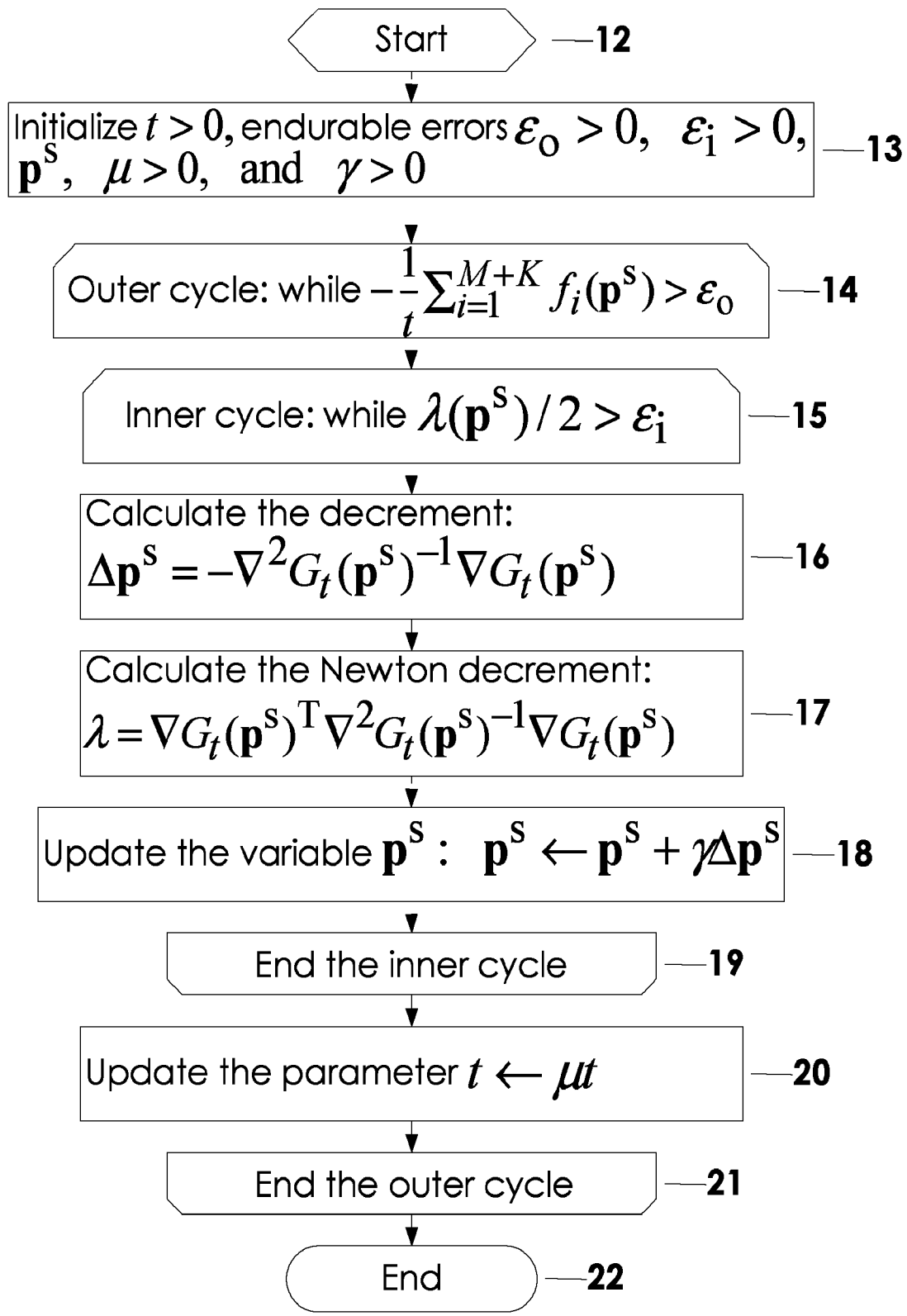
FIG. 2 shows the block diagram illustrating the iteration process of searching the optimal solution to (19).

Problem (18) can be solved by iterative searching in the constraint domain. One possible solution is to firstly transform (18) into an equivalent problem $$\min G_t(p^s) = \min[-t\sum_{k=1}^{K} \log(1+g_k P_k^s) - \sum_{i=1}^{K+M} \log f_i(p^s)], \quad (19)$$

where $f_i(p^s) = a_i^T p^s - b_i$ and $a_i^T$, is the ith column vector of A. Then, the iterative searching process in FIG. 2 is used to find the optimal $p^s$. Specifically, after the searching process starts 12, the input parameters are initialized as t>0, $\varepsilon_o$>0, $\varepsilon_i$>0, $p^s \in \{Ap^s - b \leq 0, p_i \geq 0\}$, $\mu$>0, and $\gamma$>0, where $\varepsilon_o$ and $\varepsilon_i$ are endurable errors for the outer and inner searching cycles respectively, while $\mu$ and $\gamma$ are two adjusting parameters 13. Then, the outer searching cycle runs while $$-\frac{1}{t}\sum_{i=1}^{M+K} \log f_i(p^s) > \varepsilon_o$$

14, and the inner searching cycle runs while $\lambda(p^s)/2 > \varepsilon_i$ 15. Inside the inner cycle, the first step is to calculate the decrement $\Delta p^s = -\nabla^2 G_t(p^s)^{-1} \nabla G_t(p^s)$ 16. After that, the Newton decrement is calculated as $\lambda = \nabla G_t (p^s)^T \nabla^2 G_t(p^s)^{-1} \nabla G_t (p^s)$ 17. Then, the variable $p^s$ is updated as $p^s \leftarrow p^s + \gamma \Delta p^s$ 18. After the inner cycle ends 19, the parameter t is updated as $t \leftarrow \mu t$ 20. After the outer cycle ends 21, the whole process ends 22.

With the solution of problem (19), the power allocation matrix can be computed as $$p_{mk} = \frac{p_k^s |h_{mk}^{inv}|^2}{\sum_{m=1}^{M} |h_{mk}^{inv}|^2}, m = 1, \ldots, M, k = 1, \ldots, K. \quad (20)$$

With $p_{mk}$ in (20), the elements $w_{mk}$ of the precoding matrix W can be computed by $w_{mk} = \sqrt{p_{mk}} e^{j\theta_{mk}}$, m=1, ..., M, and k=1, ..., K.

If CB is employed by the BS, it firstly computes the phases of the elements of precoding matrix W as $$\phi_{mk} = -\theta_{mk}, m=1, \ldots, M, k=1, \ldots, K, \quad (21)$$

then it computes the elements of the precoding matrix W as $$w_{mk} = \sqrt{\frac{P_k}{M}} e^{j\phi_{mk}}, m = 1, \ldots, M, k = 1, \ldots, K. \quad (22)$$

Figure 3:
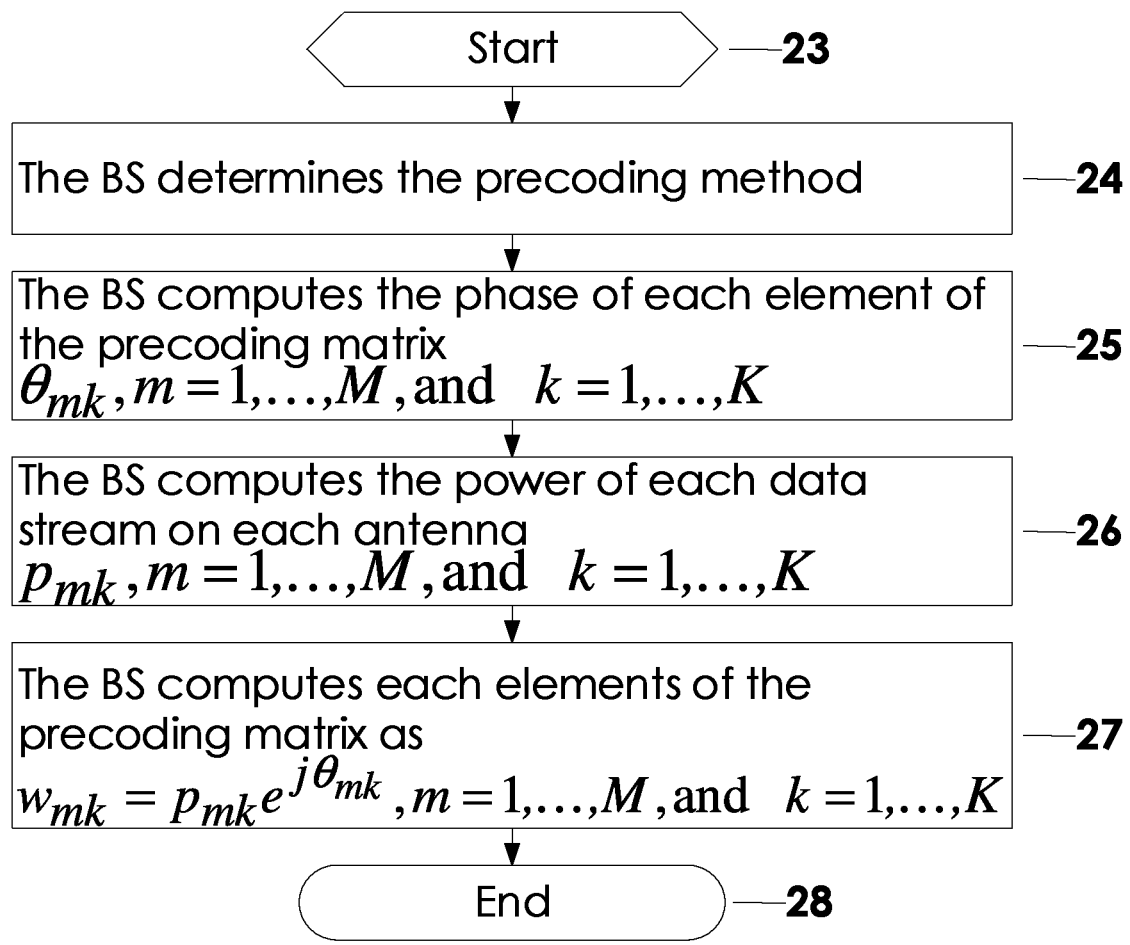
FIG. 3 shows a block diagram illustrating the process of power allocation and precoding matrix computation.

The process of power allocation and precoding matrix computation is illustrated in FIG. 3. Specifically, after the process starts 23, the BS determines the precoding method first 24. Then, the BS computes the phase of each element of the precoding matrix $\theta_{mk}$ 25. Next, the BS computes the power of each data stream on each antenna $p_{mk}$ 26. After that, the BS computes each elements of the precoding matrix as $w_{mk} = p_{mk} e^{j\phi_{mk}}$ 27, before the process ends 28.

With the precoding matrix W, the signals belonging to these K data streams are precoded, further processed, and sent by the M antennas.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method for power allocation in a Multi-User Multiple Input Multiple Output (MU-MIMO) Base Station (BS) with an array of M antennas comprising computing a temporary precoding matrix based on a channel matrix to generate K multiplexed data streams in a downlink in a Resource Element (RE) where M>K;

computing a vector with elements that are ratios of a magnitude of elements of the temporary precoding matrix;

using the vector to calculate power allocation to each data stream on each of said antennas to maximize power utilization in the MU-MIMO BS;

generating a precoding matrix using the temporary precoding matrix and the calculated power allocation to generate K multiplexed data streams in the downlink in the RE, wherein the RE is a subcarrier or a resource block;

allocating the calculated power to each data stream on each of said antennas using the precoding matrix; and transmitting the generated K multiplexed data streams via the M antennas.

2. The method in claim 1, wherein calculating power allocation to maximize power utilization is by orthogonal projection.

3. The method in claim 1, wherein calculating power allocation to maximize power utilization is by iterative searching.

4. The method in claim 1, wherein calculating power allocation to maximize the power utilization comprising constructing special matrices and vectors using numbers and values related to the antennas, an allocated power to each data stream, and a channel quality, and calculating the power allocated to each data stream on each antenna using the constructed special matrices and vectors, and using results from said calculating to obtain a final beamforming matrix to maximize the power utilization.

5. The method in claim 4, further comprising calculating the power allocated to each data stream on each antenna by orthogonal projection using the constructed special matrices and vectors.

6. The method in claim 4, further comprising calculating the power allocated to each data stream on each antenna by iterative searching using the constructed special matrices and vectors.

* * * * *